United States Patent
Takezawa et al.

(10) Patent No.: US 7,248,023 B2
(45) Date of Patent: Jul. 24, 2007

(54) CHARGER FOR LITHIUM SECONDARY BATTERY AND ELECTRONIC APPARATUS INCLUDING CHARGER

(75) Inventors: Hideharu Takezawa, Katano (JP); Masaaki Kuranuki, Kyoto (JP); Yasuhiko Bito, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 206 days.

(21) Appl. No.: 11/108,746

(22) Filed: Apr. 19, 2005

(65) Prior Publication Data

US 2005/0237029 A1    Oct. 27, 2005

(30) Foreign Application Priority Data

Apr. 22, 2004   (JP)   ............... 2004-126725

(51) Int. Cl.
*H02J 7/04*   (2006.01)
*H02J 7/16*   (2006.01)

(52) U.S. Cl. ............... 320/156; 320/161; 320/162; 429/209; 429/61; 429/218.1; 429/231.1

(58) Field of Classification Search ............... 320/156, 320/161, 162; 429/209, 61, 218.1, 231.1
See application file for complete search history.

(56) References Cited

U.S. PATENT DOCUMENTS 5,556,721 A    9/1996   Sasaki et al.
6,051,954 A *  4/2000   Nagao et al. ............... 320/101
6,657,415 B2   12/2003  Saeki et al.
6,674,265 B2   1/2004   Yoshida et al.
2005/0214646 A1* 9/2005  Kubota ............... 429/231.95

FOREIGN PATENT DOCUMENTS

| JP | 07029602   | 1/1995  |
| JP | 2002218668 | 8/2002  |
| JP | 2002352797 | 12/2002 |
| JP | 2002359008 | 12/2002 |

\* cited by examiner

*Primary Examiner*—Karl Easthom
*Assistant Examiner*—Ramy Ramadan
(74) *Attorney, Agent, or Firm*—Stevens, Davis, Miller & Mosher, LLP (57) ABSTRACT

A charger for a secondary battery including a positive electrode, a negative electrode including lithium-containing silicon represented by the composition formula $Li_xSi$, and an electrolyte. This charger includes: (1) a voltage detector that detects voltage of the secondary battery that is being charged; and (2) a charge controller that calculates the value x in $Li_xSi$ included in the secondary battery from an output of the voltage detector and stops the charging of the secondary battery when the calculated value x reaches a predetermined threshold value. The charge controller has at least one settable threshold value including a first threshold value, and the first threshold value is 2.33 or less. The use of this charger makes it possible to charge the secondary battery such that it has a high capacity, or a higher capacity if necessary, without accelerating the deterioration of cycle life.

5 Claims, 5 Drawing Sheets

CHARGER FOR LITHIUM SECONDARY BATTERY AND ELECTRONIC APPARATUS INCLUDING CHARGER

BACKGROUND OF THE INVENTION

The present invention relates to a charger for lithium secondary batteries.

In portable electronic apparatus, such as information devices, communications devices, receivers, and video/music recorder/players, and transportation apparatus, such as electric vehicles, their throughput, display ability, power performance, driving time, etc. have recently been required to be improved. Therefore, electrochemical devices used in such apparatus have been required to have higher capacities, higher outputs, and improved cycle life. Such requirements have lead to the developments of electrode materials for realizing batteries with high energy density, and to the developments of charge systems for maximizing the performance of high energy density batteries to make such apparatus operate effectively.

With respect to electrode materials for such lithium secondary batteries, carbon materials, such as graphite, have already been put to practical use as negative electrode active materials, because they are superior in reversibility and reliability. However, since the practical capacity of graphite has become close to the theoretical capacity thereof, research into electrode materials having higher capacities is being carried out. For example, Japanese Laid-Open Patent Publication No. Hei 07-29602 and Japanese Laid-Open Patent Publication No. 2002-352797 propose the use of elements such as silicon (Si) and tin (Sn) and alloys including such elements, which are theoretically expected to offer capacities significantly higher than conventional electrode materials.

Figure 5:
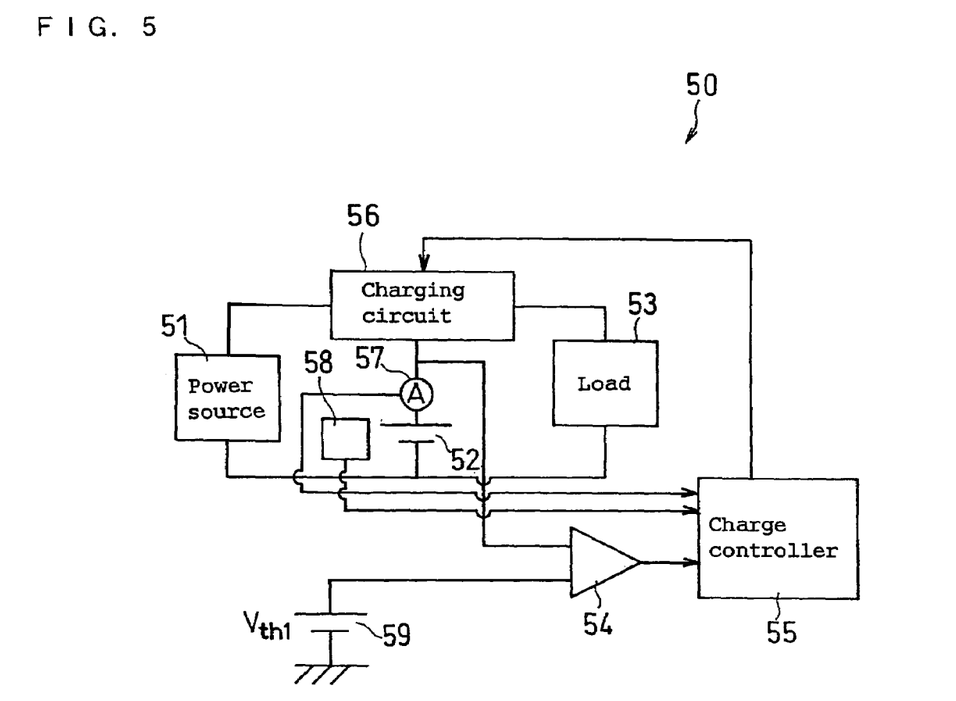
FIG. 5 is a schematic diagram showing an electronic apparatus equipped with a conventional charger.

An electronic apparatus equipped with a conventional charge system is schematically illustrated in FIG. 5.

An electronic apparatus 50 of FIG. 5 includes a power source 51, an electrochemical device 52, a load 53, a voltage comparator 54 which measures the voltage of the electrochemical device 52 relative to threshold voltage $V_{th}$, a charge controller 55, a charging circuit 56, a current measuring means 57 which measures the current flowing through the electrochemical device 52, and a temperature detecting means 58 which measures the temperature of the electrochemical device 52. The charge system is composed of the voltage comparator 54, the charge controller 55, the charging circuit 56, and the current measuring means 57 and the temperature detecting means 58. Also, the threshold voltage $V_{th}$ is applied by a reference power source 59.

Such a charge system detects the voltage of an electrochemical device, such as a lithium secondary battery or a nickel-metal hydride battery, and determines the remaining capacity of the electrochemical device in consideration of factors, such as current and temperature upon the voltage detection.

With such a conventional charge system, when an electrochemical device is fully charged, the charging of the electrochemical device is stopped. When the voltage of the electrochemical device drops below the lowest operating voltage of the apparatus, the discharging of the electrochemical device is stopped, and the electrochemical device is then fully charged. This ensures that the electrochemical device constantly has a maximum remaining capacity before the use of the apparatus, thereby making it possible to supply electric power stably. Such stable power supply enables the apparatus to have a maximum driving duration.

However, according to such charge/discharge method in which an electrochemical device is charged up to 100% remaining capacity and is discharged down to the lowest operating voltage of an apparatus powered by the electrochemical device, repetitive charge/discharge cycles cause the battery capacity to drop significantly upon full charge. That is, a problem of cycle life deterioration occurs. In order to solve this problem, there have been proposed methods that employ two end-of-charge voltages: a first end-of-charge voltage which maximizes the charge capacity of an electrochemical device; and a second end-of-charge voltage which is lower than the first end-of-charge voltage. According to these methods, an electrochemical device is charged up to one of the end-of-charge voltages, depending on the circumstances (e.g., see Japanese Laid-Open Patent Publication No. 2002-218668 (page 9, FIG. 1) and Japanese Laid-Open Patent Publication No. 2002-359008).

However, how to determine such voltages and the deterioration mechanism of electrochemical devices are not clearly described in Japanese Laid-Open Patent Publication No. 2002-218668 and Japanese Laid-Open Patent Publication No. 2002-359008. Thus, when such a charging method is used to charge an electrochemical device, end-of-charge voltages must be determined by trial and error. When the thus-determined end-of-charge voltages are used as reference voltages in performing charge/discharge control, the set end-of-charge voltage may be lower than preferable end-of-charge voltage, since the deterioration of electrochemical devices is not completely analyzed. In this case, the electrochemical device is not charged fully, so there is a problem in that the operating time of an electronic apparatus, a transportation apparatus, or the like becomes shortened.

On the other hand, if the set end-of-charge voltage is higher than the preferable end-of-charge voltage, not only battery life but also the reliability, safety and maintainability of the charge/discharge system deteriorate.

Further, in the charging method of Japanese Laid-Open Patent Publication No. 2002-218668, the second end-of-charge voltage is employed when a battery incorporated in a notebook PC is trickle-charged by AC power through an AC adapter to make up for the self-discharge of the battery. Therein, by setting the second end-of-charge voltage to a voltage lower than the first end-of-charge voltage, the deterioration of the battery in a high-temperature environment is prevented. In this case, it appears that the second end-of-charge voltage, which is lower than the first end-of-charge voltage, is determined on the assumption that the decomposition of the electrolyte is prevented even under a high-temperature environment. The second end-of-charge voltage is not determined in consideration of the deterioration in cycle life.

Meanwhile, the cycle life of a battery may deteriorate when a material that is expected to provide a high capacity, such as Si, absorbs a large amount of lithium during charging. The reason is described below.

When a negative electrode contains lithium-containing silicon represented by the composition formula $Li_xSi$, the molar ratio x of Li to Si, which represents the charge/discharge depth of the negative electrode, is correlated to charge/discharge cycle life.

As the molar ratio x of Li to Si increases, the lithium-containing silicon undergoes phase changes at predetermined molar ratios x, and it is known that such phase changes cause the following five phases: x=0 (Si: cubic); x=1.71 ($Li_{12}Si_7$: rhombic); x=2.33 ($Li_{14}Si_6$: rhombohedral); x=3.25 ($Li_{13}Si_4$: rhombic); x=4.4 ($Li_{22}Si_5$: cubic). In the lithium-containing silicon, the higher the value x is, the higher the theoretical capacity is.

The occurrence of the above-mentioned phase changes due to changes in the value x results in changes in the volume of the lithium-containing silicon. For example, when x=4.4, the volume of the lithium-containing silicon expands approximately 4.1-fold, compared with the volume when x=0. Thus, if the full charge and full discharge of a battery including lithium-containing silicon as a negative electrode active material are repeated, the volume of the lithium-containing silicon changes greatly. Upon repetition of such charge and discharge, the lithium-containing silicon becomes unable to accommodate such volume changes, so that the lithium-containing silicon itself becomes broken, thereby resulting in a deterioration in the cycle life of such a battery.

Further, if the value x increases to cause a large expansion of the negative electrode, the current collecting performance of the lithium-containing silicon lowers. As a result, a battery with a negative electrode including lithium-containing silicon has a problem of degradation of the actual capacity of the battery.

In view of the above, it is therefore an object of the present invention to provide a charger that is capable of charging a lithium secondary battery including lithium-containing silicon as a negative electrode active material such that the battery has a high capacity, or a higher capacity if necessary, without accelerating the deterioration in cycle life, and an electronic apparatus equipped with such a charger.

BRIEF SUMMARY OF THE INVENTION

In order to solve the problems as described above, the present invention is directed to a charger for a secondary battery including a positive electrode, a negative electrode including lithium-containing silicon represented by the composition formula $Li_xSi$, and an electrolyte. This charger includes: (1) a voltage detector that detects voltage of the secondary battery that is being charged; and (2) a charge controller that calculates the value x in $Li_xSi$ included in the secondary battery from an output of the voltage detector and stops the charging of the secondary battery when the calculated value x reaches a predetermined threshold value. The charge controller has at least one settable threshold value including a first threshold value, and the first threshold value is 2.33 or less.

In the charger, preferably, the charge controller has at least two settable threshold values including a first threshold value and a second threshold value, the first threshold value and the second threshold value are freely switchable, the first threshold value is 2.33 or less, and the second threshold value is greater than 2.33 and not greater than 4.4.

It is preferred that the negative electrode further contain $MeSi_2$ where Me is at least one selected from the group consisting of Ti, Ni, Co and Fe. It is also preferred that the $MeSi_2$ include $TiSi_2$.

The present invention also relates to an electronic apparatus including: a secondary battery including a positive electrode, a negative electrode including lithium-containing silicon represented by the composition formula $Li_xSi$, and an electrolyte; a load; and the above-described charger.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Referring now to the drawings, the present invention is described.

EMBODIMENT 1

Figure 1:
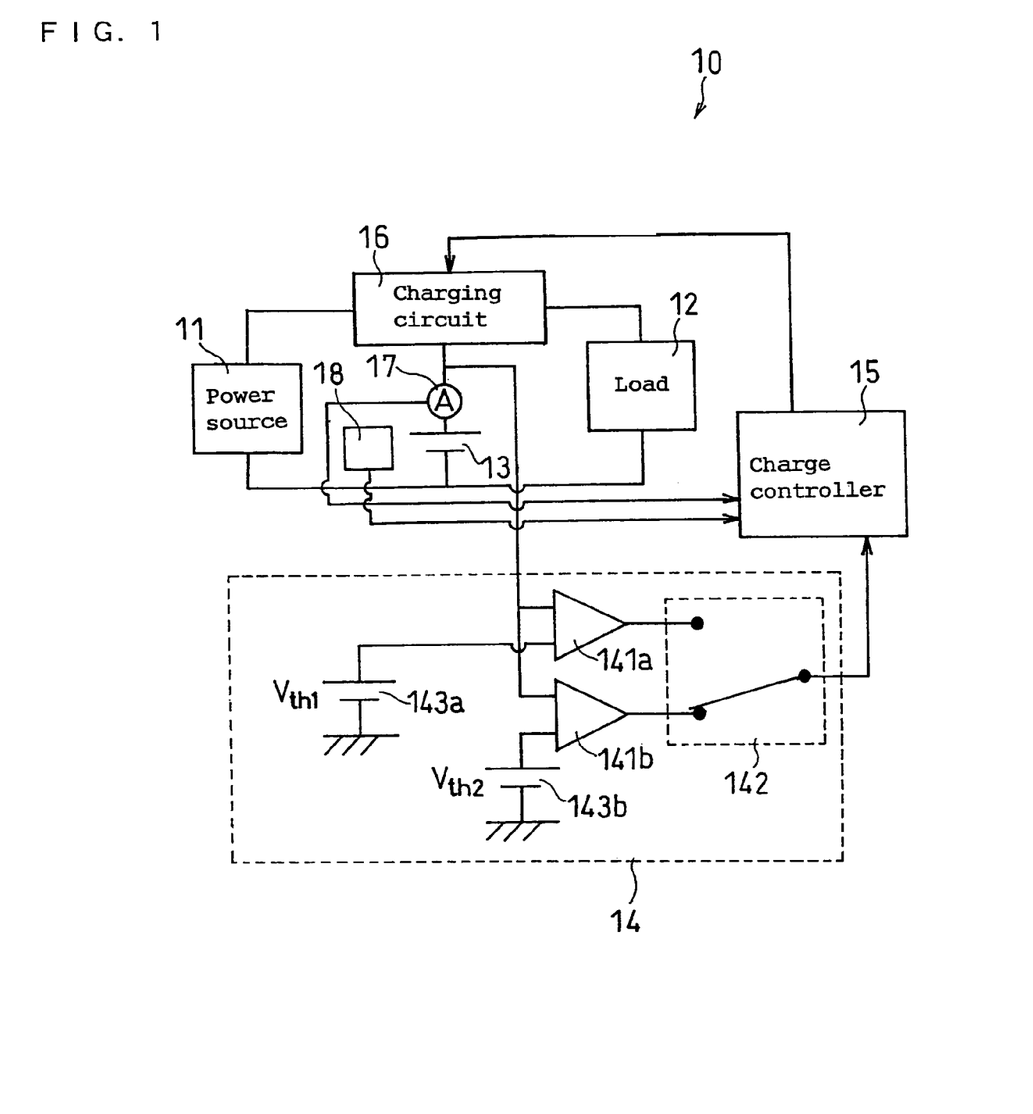
FIG. 1 is a schematic diagram showing an electronic apparatus equipped with a charger according to one embodiment of the present invention.

FIG. 1 is a schematic diagram of an electronic apparatus equipped with a charger for a secondary battery that includes a positive electrode, a negative electrode including lithium-containing silicon represented by the composition formula $Li_xSi$, and an electrolyte.

An electronic apparatus 10 as illustrated in FIG. 1 includes a load 12, a secondary battery 13, and a charger. The charger includes a voltage detector 14, a charge controller 15, and a charging circuit 16.

For example, the portable electronic apparatus 10 is driven when electric power is supplied from the secondary battery 13 to the load 12.

In this embodiment, the secondary battery 13 is charged with power supplied from a power source 11 through the charging circuit 16.

Examples of the power source 11 include power supply means, such as a fuel cell, a solar battery, and a generator which an engine is equipped with. Also, power may be supplied from utility power through an AC adapter.

The charger is now described.

As described above, the secondary battery 13 is charged with power supplied from the power source 11 through the charging circuit 16. According to the present invention, the secondary battery 13 is charged such that the molar ratio of Li to Si in lithium-containing silicon ($Li_xSi$) included therein is a desired value x'. Such charging of the secondary battery 13 is controlled by the charging circuit 16 based on the output from the charge controller 15. The charge controller 15 has at least one desired molar ratio x' that is preset as the threshold value $x_{th}$.

The molar ratio x of Li in $Li_xSi$ included in the secondary battery 13 that is being charged is calculated by the charge controller 15, for example, from the voltage of the secondary battery 13. In this embodiment, the voltage of the secondary battery 13 that is being charged is measured by the voltage detector 14 connected to the secondary battery 13. The molar ratio x of Li increases as the charging of the secondary battery proceeds, and as the molar ratio x increases, the voltage of the secondary battery also increases. There is a predetermined correlation between the increase in the molar ratio x of Li and the increase in the voltage of the secondary battery. It is therefore possible to predict the voltage of the secondary battery from the molar ratio x of Li, or to predict the molar ratio x of Li from the voltage of the secondary battery.

Also, in calculating the molar ratio x of Li, the value x may also be calculated in consideration of the outputs from a current measuring means 17, which is connected in series to the secondary battery 13 and measures the charge current of the secondary battery 13, and/or a temperature detecting means 18, which measures the temperature of the secondary battery 13, as illustrated in FIG. 1. This is because the battery voltage obtained when the molar ratio of Li is x may vary depending on the temperature and/or charge current of the secondary battery 13. The range of $V_{th}$ corresponding to the threshold value $x_{th}$ is preferably ±10% to ±20%, most preferably +0% to −10%, relative to the voltage determined depending on the value x, in consideration of changes, for example, in the charge current of the secondary battery 13, the temperature of the secondary battery 13, and/or the impedance of the secondary battery 13.

The voltage detector 14 connected to the secondary battery 13 detects the voltage of the secondary battery 13 that is being charged, with the threshold voltage as reference voltage. As used herein, the threshold voltage refers to the voltage $V_{th}$ of the secondary battery obtained when the molar ratio x of Li in the lithium-containing silicon included in the negative electrode of the secondary battery is a predetermined threshold value $x_{th}$.

The charge controller 15 compares the calculated molar ratio x with the preset threshold value $x_{th}$. If the calculated molar ratio x exceeds the preset threshold value $x_{th}$, the charging circuit 16 stops the charging of the secondary battery 13 based on the output from the charge controller 15. If the calculated value x does not exceed the preset threshold value, the charging circuit 16 continues charging the secondary battery 13 based on the output from the charge controller 15. It is to be understood that the charging of the secondary battery 13 by the charging circuit 16 can be performed by constant current charge, a combination of constant current charge and constant voltage charge, or the like. In the present invention, the voltage of the secondary battery 13 that is being charged is measured by the voltage detector, and based on the output from the voltage detector, the charge controller calculates the molar ratio x of lithium. Thus, the charging of the secondary battery 13 can be basically performed by constant current charge.

Also, the combination of constant current charge and constant voltage charge may be employed to charge the secondary battery 13. In this case, first, the secondary battery 13 is charged by constant current charge until the molar ratio x of lithium in $Li_xSi$ included therein becomes close the desired molar ratio x', and is then charged by constant voltage charge such that the molar ratio x of lithium is the desired molar ratio x'.

Figure 2:
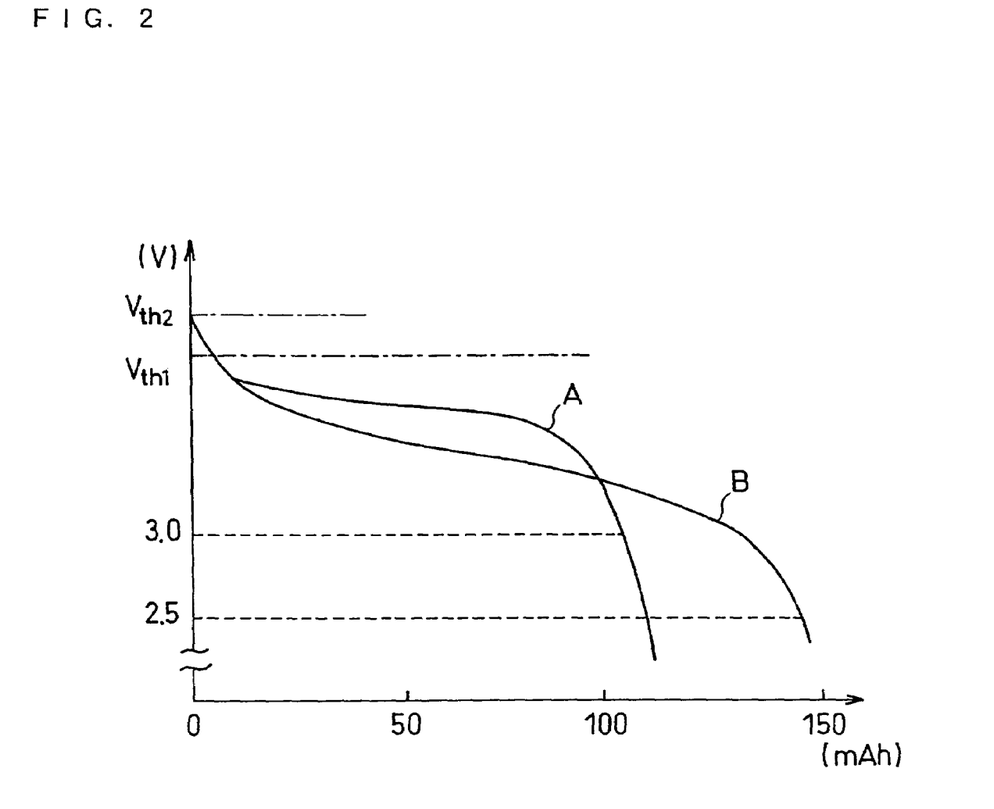
FIG. 2 shows a discharge curve (A) of a battery using a carbon material as a negative electrode active material and a discharge curve (B) of a battery using silicon as a negative electrode active material used in the present invention.

FIG. 2 shows an exemplary discharge curve (A) of a lithium secondary battery with a negative electrode containing a carbon material as a negative electrode active material, a positive electrode, and an electrolyte, and an exemplary discharge curve (B) of a lithium secondary battery with a negative electrode including lithium-containing silicon as a negative electrode active material, a positive electrode, and an electrolyte.

Generally, in lithium secondary batteries including a carbon material as a negative electrode active material, the end-of-charge voltage is 4.2 V, and the end-of-discharge voltage is 3.0 V.

With $V_{th2}$ of FIG. 2 (this is also the end-of-charge voltage) being 4.2 V, the lithium secondary battery including lithium-containing silicon as the negative electrode active material is compared with the lithium secondary battery including a carbon material as the negative electrode active material. In this case, the lithium secondary battery including lithium-containing silicon as the negative electrode active material, as used in the present invention, exhibits a slight voltage drop, but its battery capacity increases. For example, suppose that the secondary battery including lithium-containing silicon as the negative electrode active material is used until its voltage drops to 2.5 V, at which the conventional lithium secondary battery including a carbon material as the negative electrode active material is unserviceable, or serviceable but with few merits in terms of capacity. In such conditions, the capacity of the battery including lithium-containing silicon as the negative electrode active material can be heightened.

Also, it can be seen that even when the end-of-charge voltage of the lithium secondary battery including lithium-containing silicon as the negative electrode active material, as used in the present invention, is set to $V_{th1}$, which is lower than $V_{th2}$, the battery capacity thereof becomes higher than that of the lithium secondary battery including a carbon material as the negative electrode active material.

In the present invention, the charge controller 15 has, as the desired molar ratio x', at least one settable threshold value including a first threshold value, or at least two settable threshold values including a first threshold value and a second threshold value. The first threshold value is 2.33 or less, and the second threshold value is greater than 2.33 and not greater than 4.4.

In the present invention, the first threshold value is selected to be a settable value of 2.33 or less. For example, when a battery is charged until the molar ratio x of Li reaches 2.33, the battery has a high capacity and a long cycle life, compared with the conventional battery including a carbon material in the negative electrode. This is because the volume change of $Li_xSi$ upon charge is remarkably suppressed when the value x is 2.33 or less.

The second threshold value is selected to be a settable value that is greater than 2.33 and not greater than 4.4. In this case, a battery can be charged such that it has a higher capacity than when the battery is charged up to the first threshold value. This enables the battery to be used for a dramatically long period of time. The amount of lithium that can be absorbed in $Li_xSi$ becomes maximum when x=4.4.

Further, when the charge controller 15 has at least two settable threshold values including a first threshold value and a second threshold value, at least the first threshold value and the second threshold value are freely switchable. Accordingly, by simply switching between the threshold values preset in the charge controller, the secondary battery including $Li_xSi$ in the negative electrode can be easily charged such that it has a long cycle life and a high capacity, or even a higher capacity.

In the secondary battery with the negative electrode including lithium-containing silicon, a positive electrode, and an electrolyte, the negative electrode preferably includes an intermetallic compound, an oxide such as SiO, $SiO_2$, or Li$_2$O, conductive ceramics such as TiN, TiB$_2$, or TiC, or the like, in addition to the negative electrode active material of lithium-containing silicon, with the aim of suppressing the volume change of the lithium-containing silicon upon charge and discharge. Examples of the intermetallic compound include those represented by the general formula: MeSi$_2$ (Me is at least one selected from the group consisting of Ti, Ni, Co and Fe).

Among them, MeSi$_2$ (Me is at least one selected from the group consisting of Ti, Ni, Co and Fe) is preferred in terms of electronic conductivity. That is, MeSi$_2$ can improve the conductivity of electrons to Si. Further, since MeSi$_2$ does not absorb or desorb lithium upon charge and discharge, it can effectively suppress the volume change of the negative electrode including the lithium-containing silicon, thereby preventing the active material of the lithium-containing silicon from becoming broken. As described above, when MeSi$_2$ or the like is included in the negative electrode, cycle characteristics can be maintained even in a region where the value x is large, as compared with when no such substance is included. Thus, over a wide range of x, high capacity and cycle characteristics are mutually compatible.

Also, when the negative electrode includes lithium-containing silicon and MeSi$_2$, it is preferred that the lithium-containing silicon and MeSi$_2$ form a composite. In such a composite, it is more preferred that both the phase of lithium-containing silicon and the phase of MeSi$_2$ be amorphous, or that both phases be microcrystalline and mixed with each other with their crystallite size being approximately several nm to several tens of nm. This makes it possible to further enhance the compatibility between high capacity and cycle characteristics.

The negative electrode may include one kind of MeSi$_2$ or two or more kinds of MeSi$_2$. Also, MeSi$_2$ preferably includes TiSi$_2$. This is because TiSi$_2$ has a high electronic conductivity among the intermetallic compounds represented by MeSi$_2$. Similarly, when the negative electrode includes two or more kinds of MeSi$_2$, one of them is preferably TiSi$_2$.

When the negative electrode active material includes lithium-containing silicon and other substance(s), as described above, the value x, which represents the amount of lithium in lithium-containing silicon, can be expressed differently, according to the chemical composition of the active material. For example, when the negative electrode active material includes the phase of lithium-containing silicon (Li$_x$Si) and the phase of MeSi$_2$, provided that the mole fraction of MeSi$_2$ relative to the total of Li$_x$Si and MeSi$_2$ is y (0≦y<1), the negative electrode active material is expressed by the composition formula: Li$_{x(1-y)}$Me$_y$Si$_{(1+y)}$. Although the range of the value x in Li$_x$Si is defined, for example, as x≦2.33, the range of the value x in the negative electrode active material which includes Li$_x$Si and MeSi$_2$ can also be defined as x(1−y)≦2.33(1−y).

It is preferred that the mixing ratio Li$_x$Si:MeSi$_2$ (molar ratio) be 1:0.03 to 1:1.5. If the molar ratio of MeSi$_2$ is smaller than 0.03, the electronic conductivity is impaired, which may result in a degradation in cycle characteristics. If the molar ratio of MeSi$_2$ exceeds 1.5, the proportion of Li$_x$Si decreases, so that high capacity may not be achieved.

Next, the case of the charge controller having a first threshold value and a second threshold value is described with reference to FIG. 1.

The charge controller 15 as illustrated in FIG. 1 has a first threshold value x$_{th1}$ and a second threshold value x$_{th2}$ which are preset. Also, the voltage detector 14 includes two voltage comparators 141a and 141b and a switching means 142. The voltage detector 14 has two threshold voltages set therein: a voltage V$_{th1}$ corresponding to the first threshold value x$_{th1}$ that is preset in the charge controller 15; and a voltage V$_{th2}$ corresponding to the second threshold value x$_{th2}$. The voltage detector 14 detects the voltage of the secondary battery, with the threshold voltages as reference voltages.

The voltage comparator 141a has the threshold voltage V$_{th1}$ corresponding to the first threshold value as the reference voltage, while the voltage comparator 141b has the threshold voltage V$_{th2}$ corresponding to the second threshold value as the reference voltage. In the voltage comparators 141a and 141b, the threshold voltages V$_{th1}$ and V$_{th2}$ are applied by reference power sources 143a and 143b, respectively.

For example, when the second threshold value x$_{th2}$ is selected as the desired molar ratio x' in the charge controller 15, the voltage comparator 141b and the charge controller 15 are selectively connected by the switching means 142, as illustrated in FIG. 1. In this way, the threshold voltage V$_{th2}$, which serves as the reference voltage for detecting the voltage of the secondary battery 13, can be selected.

The information on the voltage detected in the above manner is sent to the charge controller 15 as the output from the voltage detector 14.

Based on the output from the voltage detector 14, the charge controller 15 calculates the value x in Li$_x$Si included in the negative electrode of the secondary battery 13 that is being charged. The calculated value x is then compared with the set threshold value x$_{th}$.

Based on the output from the charge controller 15, the charging circuit 16 controls the charging of the secondary battery 13. If the calculated value x is smaller than the set threshold value x$_{th}$, the charge controller 15 gives the charging circuit 16 an instruction that the charging of the secondary battery 13 be continued. If the charge controller 15 determines that the calculated value x has reached the set threshold value x$_{th}$, it gives the charging circuit 16 an instruction that the charging of the secondary battery 13 be stopped, whereby the charging of the secondary battery 13 is stopped.

As described above, in the present invention, one threshold value is selected at the charge controller 15, and the voltage of the secondary battery corresponding to the selected threshold value is selected as the reference voltage at the voltage detector 14. This makes it possible to easily charge the secondary battery such that the value x in Li$_x$Si included in the negative electrode thereof is the predetermined value.

In the foregoing description, the molar ratio x is determined by detecting the voltage of the charged secondary battery 13 with analog hardware, such as the electronic circuit. Other than this method, the molar ratio x may be determined by using an AD converter as the voltage comparator and processing the digital data from the AD converter with software in the charge controller 15.

The selection of a threshold value in the charge controller and the manipulation of the switching means may be carried out by the user. Also, the manipulation of the switching means may be automatically performed upon the selection of a threshold value in the charge controller by the user. Further, the electronic apparatus equipped with the charger according to the present invention may be configured so as to learn the status of use by the user, select a threshold value in the charge controller, and perform the manipulation of the switching means.

Also, the charge controller 15 may have the functions of the charging circuit 16. In this case, there is no need to provide the charging circuit 16.

EMBODIMENT 2

Figure 3:
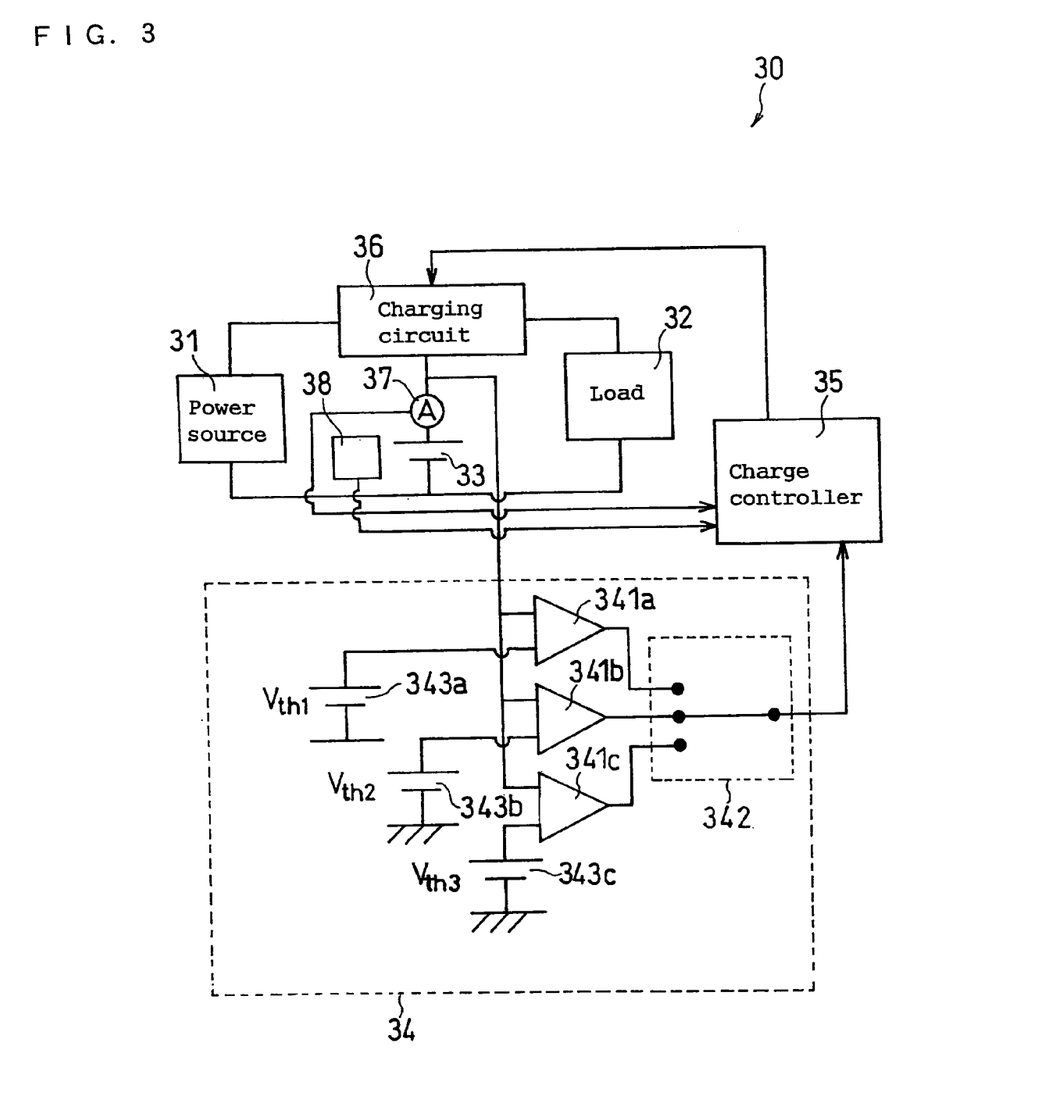
FIG. 3 is a schematic diagram showing an electronic apparatus equipped with a charger according to another embodiment of the present invention.

FIG. 3 is a schematic diagram of an electronic apparatus equipped with a charger, in which the charge controller has three threshold values and the voltage detector accordingly has three voltage comparators.

In this embodiment, an electronic apparatus 30 includes a load 32, a secondary battery 33, and a charger. The charger includes a voltage detector 34, a charge controller 35, and a charging circuit 36.

In the same manner as in Embodiment 1, the electronic apparatus 30 is driven when electric power is supplied from the secondary battery 33 to the load 32. The secondary battery 33 is charged with power supplied from a power source 31 through the charging circuit 36.

This embodiment is the same as Embodiment 1, except that the electronic apparatus 30 is configured such that the charge controller 35 has three threshold values of a first threshold value $x_{th1}$, a second threshold value $x_{th2}$, and a third threshold value $x_{th3}$, and that the voltage detector 34 has three voltage comparators 341a, 341b, and 341c.

The three voltage comparators 341a, 341b, and 341c have voltages $V_{th1}$, $V_{th2}$, and $V_{th3}$ of the secondary battery, which correspond to the first threshold value $X_{th1}$, the second threshold value $x_{th2}$, and the third threshold value $x_{th3}$, respectively, as reference voltages. In these three voltage comparators 341a, 341b, and 341c, the three voltages are applied by reference power sources 343a, 343b, and 343c, respectively. FIG. 3 illustrates the charge controller 35 being connected to the voltage comparator 341b.

In this embodiment, the first threshold value is 2.33 or less, and the second threshold value is greater than 2.33 and not greater than 4.4. As the third threshold value, a value that is 4.4 or less and different from both the first threshold value and the second threshold value is set.

Figure 4:
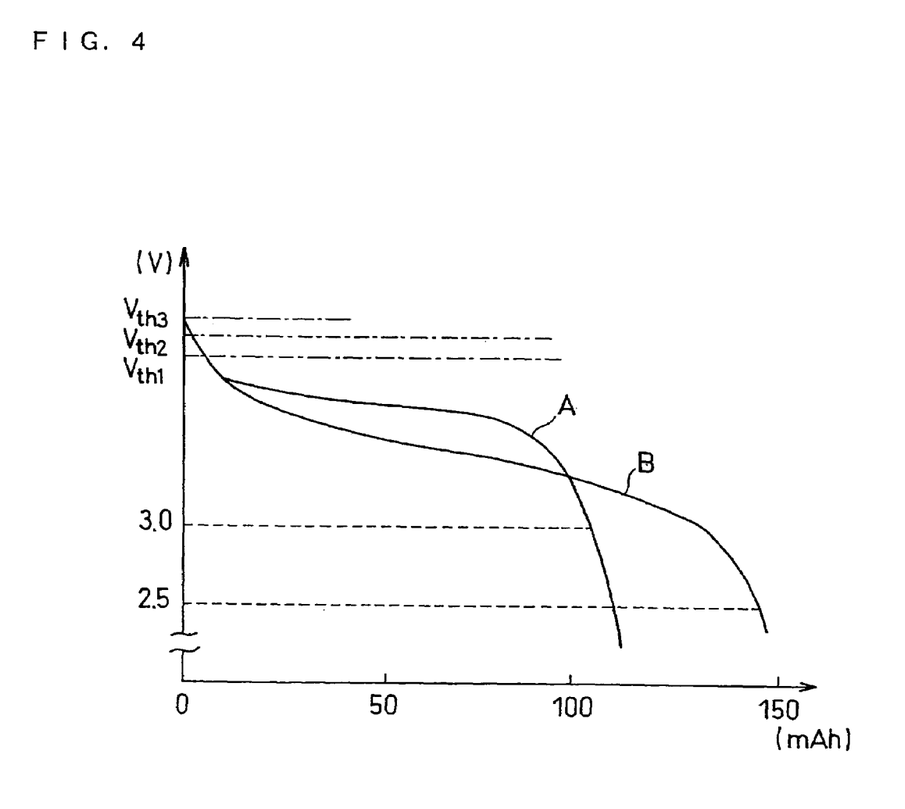
FIG. 4 shows a discharge curve (A) of a battery using a carbon material as a negative electrode active material and a discharge curve (B) of a battery using silicon as a negative electrode active material used in the present invention.

FIG. 4 shows an exemplary discharge curve (B) of a secondary battery with a negative electrode that includes lithium-containing silicon as a negative electrode active material, a positive electrode, and an electrolyte. In the same manner as in FIG. 2 as described in Embodiment 1, it can be seen that the secondary battery (B), which has the negative electrode including lithium-containing silicon as the negative electrode active material, a positive electrode, and an electrolyte, has a higher capacity than a battery (A) including a carbon material as the negative electrode active material, provided that it is charged up to the threshold voltage $V_{th1}$, $V_{th2}$ or $V_{th3}$ and is serviceable down to 2.5 V.

For example, by setting the third threshold value to a settable value x of 2.33 or less and switching among these threshold values according to the circumstances in the charge controller 35, it becomes possible to make this charger suited for charging the secondary battery 33 such that it has not only a high capacity but also a long cycle life.

By setting the third threshold value to a settable value between 2.33 and 4.4 and switching among these threshold values according to the circumstances in the charge controller 35, it becomes possible to make the charger of the present invention suited for charging the secondary battery 33 such that it has a higher capacity.

In the same manner as in Embodiment 1, the selection of a threshold value in the charge controller 35 and the manipulation of a switching means 342 may be carried out by the user. Also, the manipulation of the switching means 342 may be automatically performed upon the selection of a threshold value in the charge controller 35 by the user. Further, the electronic apparatus equipped with the charger according to the present invention may be configured so as to learn the status of use by the user, select a threshold value used in the charge controller 35, and perform the manipulation of the switching means.

In the same manner as in Embodiment 1, the charge controller 35 may calculate the value x in consideration of the outputs from a current measuring means 37 and/or a temperature detecting means 38.

EMBODIMENT 3

This embodiment describes the case where the charge controller has at least one settable threshold value including a first threshold value and the first threshold value is 2.33 or less.

In this case, at least one voltage including the voltage corresponding to the first threshold value is set as a threshold voltage in the voltage detector.

The other components than the voltage detector are the same as those in Embodiment 1.

As described above, by setting a first threshold value of 2.33 or less and charging the secondary battery such that the molar ratio x of Li in lithium-containing silicon included therein reaches the first threshold value, the secondary battery can be charged such that it has a high capacity and a long cycle life.

Also, for example, when the charge controller has another threshold value of less than 2.33 other than the first threshold value, the secondary battery can be charged such that it has a longer cycle life.

In this case, in the voltage detector, the voltage of the secondary battery corresponding to the another threshold value of less than 2.33 is set to a threshold voltage as a reference voltage, in addition to the voltage of the secondary battery corresponding to the first threshold value. In this case, the same number of voltage comparators and reference power sources as the number of threshold voltages set as the reference voltages are also necessary.

Also, the selection of a threshold value in the charge controller and the selection of a threshold voltage in the voltage detector can be performed in the same manner as in Embodiment 1.

In this way, when the charge controller has at least one settable threshold value including the first threshold value, the secondary battery can also be charged such that it has a high capacity and, particularly, an improved cycle life.

In this case, also, in the same manner as in Embodiment 1, the charge controller may calculate the value x in consideration of the outputs from the current measuring means and/or the temperature detecting means.

EXAMPLE 1

(Secondary Battery Production)

(Negative Electrode Preparation)

[Negative Electrode A]

Si was used as a negative electrode active material. A 5-μm-thick Si layer was formed on a 14-μm-thick copper foil by sputtering, to form a negative electrode. This was named negative electrode A.

[Negative Electrode B]

A negative electrode active material was synthesized from the starting material of Ti—Si alloy, which was prepared by a melting method, by mechanical alloying in an argon atmosphere. The Ti—Si alloy used as the starting material was composed of 9% by weight of Ti and 91% by weight of Si. The synthesized negative electrode active material was analyzed by an electron diffraction method using a transmission electron microscope, and it was confirmed that the synthesized active material had two phases of Si and $TiSi_2$. The ratio Si:$TiSi_2$ (molar ratio) was turned out to be 1:0.07.

Thereafter, 80 parts by weight of the negative electrode active material thus obtained, 15 parts by weight of acetylene black serving as a conductive agent, and 5 parts by weight of SBR resin serving as a binder were added to water and mixed and kneaded together, to form a negative electrode material mixture paste. This negative electrode material mixture paste was applied onto a copper foil (thickness: 14 μm) serving as a current collector by a doctor blade method, and was dried fully, to obtain a negative electrode. This was named negative electrode B.

(Positive Electrode Preparation)

90 parts by weight of $LiCoO_2$ serving as apositive electrode active material was mixed with 3 parts by weight of acetylene black serving as a conductive agent and 5 parts by weight of polyvinylidene fluoride powder serving as a binder. N-methyl-2-pyrrolidone was added to the resultant mixture, to form a positive electrode material mixture paste. This positive electrode material mixture paste was applied onto an aluminum foil (thickness:15 μm) serving as a current collector by a doctor blade method, and was dried fully, to obtain a positive electrode.

(Electrolyte Preparation)

Ethylene carbonate (EC) was mixed with ethyl methyl carbonate (EMC) in a volume ratio of 1:1. $LiPF_6$ was dissolved in the resultant solvent mixture at a concentration of 1M, to prepare an electrolyte.

(Battery Assembly)

The negative electrode A and the positive electrode thus obtained were layered with a polyethylene micro-porous film interposed therebetween, and then rolled up, to obtain an electrode group. The electrode group was placed into a rectangular battery case composed mainly of aluminum, and the electrolyte was then injected thereinto. Thereafter, the battery case was sealed, to obtain a battery. This battery was named battery A.

Also, a battery B was produced in the same manner as the above, except for the use of the negative electrode B in place of the negative electrode A.

A lithium secondary battery was produced in the same manner as the battery A, except for the use of artificial graphite as the negative electrode active material. The resultant secondary battery was named battery C.

(Cycle Life Evaluation)

In this example, a charger as illustrated in FIG. 1 was used. The charge controller had a first threshold value and a second threshold value. The first threshold value was set to 2.33, and the second threshold value was set to 4.4.

The voltage detector accordingly had two voltage comparators. The threshold voltage $V_{th1}$, which was the reference voltage of one of the two voltage comparators, was set to 4.05 V, which was the voltage of the battery A or B corresponding to the first threshold value (x=2.33). Also, the threshold voltage $V_{th2}$, which was the reference voltage of the other voltage comparator, was set to 4.3 V, which was the voltage corresponding to the second threshold value (x=4.4).

Conventionally, the end-of-discharge voltage of lithium secondary batteries has been approximately 3 V to 3.2 V. However, in order to realize high capacity characteristics of the batteries A and B, the end-of-discharge voltages of these batteries were set to 2.5 V.

The battery A and the battery B were charged such that the value x in $Li_xSi$ included in the negative electrode reached the first threshold value, or such that the value x reached the second threshold value. In either case, the batteries were charged and discharged repeatedly. Also, in correspondence with the first threshold value or the second threshold value selected in the charge controller, switching between the threshold voltage $V_{th1}$, and the threshold voltage $V_{th2}$ was made by means of the switching means in the voltage detector.

The battery C was charged and discharged, using a conventional apparatus, with the end-of-charge voltage set to 4.2 V and the end-of-discharge voltage to 3.0 V.

The capacity retention rate was calculated using the following equation:

Capacity retention rate (%)=(Battery capacity at the 100th cycle)/(Battery capacity at the first cycle)×100

Also, the ratio of the capacity of the battery A or B at the first cycle to the capacity of the battery C at the first cycle was expressed in a percentage as the battery capacity ratio.

Table 1 shows the capacity retention rate and the battery capacity ratio.

TABLE 1

|  | Molar ratio x of Li to Si | Battery capacity ratio (%) | Capacity retention rate (%) |
| --- | --- | --- | --- |
| Battery A | 2.33 | 135 | 88 |
| Battery A | 4.4 | 160 | 25 |
| Battery B | 2.33 | 125 | 90 |
| Battery B | 4.4 | 150 | 40 |
| Battery C | — | 100 | 92 |

When x=2.3, both the battery A and the battery B had higher battery capacities than the battery C, which was charged and discharged under conventional conditions. Further, in spite of such high battery capacities, the capacity retention rates of the battery A and the battery B were equivalent to that of the battery C, which was charged under conventional conditions.

When the battery A and the battery B were charged such that x=4.4, their capacity retention rates lowered. However, they could be charged such that their battery capacities increased 1.5- to 1.6-fold. Further, it can be seen that the battery B, in which $Li_xSi$ and $TiSi_2$ form a composite, can suppress the degradation in capacity retention rate, in comparison with the battery A, which does not contain $TiSi_2$. This effect was more remarkable as the value x became higher.

EXAMPLE 2

In this Example, the battery B produced in Example 1 was used, and a charger as illustrated in FIG. 1 was used. The charge controller had a first threshold value, a second threshold value and a third threshold value. The first threshold value was set to 2.33, the second threshold value to 3.25, and the third threshold value to 4.4.

The voltage detector accordingly had three voltage comparators. The threshold voltage $V_{th1}$ was set to 4.05 V, which was the voltage of the battery B corresponding to the first threshold value (x=2.33). The threshold voltage $V_{th2}$ was set to 4.2 V, which was the voltage of the battery B corresponding to the second threshold value (x=3.25). Also, the threshold voltage $V_{th3}$ was set 4.3 V, which was the voltage of the battery B corresponding to the third threshold value (x=4.4). Also, the end-of-discharge voltage was set to 2.5 V.

The battery B was charged such that the value x in $Li_xSi$ included therein reached the first threshold value, such that the value x reached the second threshold value, or such that it reached the third threshold value. In either case, the battery was charged and discharged repeatedly. Also, in correspondence with the first threshold value, the second threshold value, or the third threshold value selected in the charge controller, switching between the threshold voltage $V_{th1}$, the threshold voltage $V_{th2}$, and the threshold voltage $Vth_3$ was made by means of the switching means in the voltage detector.

In the same manner as in Example 1, the capacity retention rate and the battery capacity ratio were obtained. Table 2 shows the results.

TABLE 2

|  | Molar ratio x of Li to Si | Battery capacity ratio (%) | Capacity retention rate (%) |
| --- | --- | --- | --- |
| Battery B | 2.33 | 125 | 90 |
| Battery B | 3.25 | 135 | 85 |
| Battery B | 4.4 | 150 | 40 |
| Battery C | — | 100 | 92 |

As shown in Table 2, it can be seen that the use of the charger of the present invention makes it possible, even when the molar ratio x is 2.33, to charge the battery with the negative electrode containing $Li_xSi$ such that it has a higher capacity than the battery C, which is a conventional lithium secondary battery.

Further, when x=2.33, the capacity retention rate of the battery B with the negative electrode containing $Li_xSi$ was almost the same as the capacity retention rate of the battery C. As described above, the battery with the negative electrode containing $Li_xSi$ could be charged such that it had a capacity higher than that of the conventional lithium secondary battery, and that it had a capacity retention rate equivalent to that of the conventional lithium secondary.

Also, when the value x was increased to 3.25 and 4.4, the battery capacity successfully increased significantly, although the capacity retention rate lowered slightly.

As described above, the charge controller has at least one settable threshold value including a first threshold value, or at least one settable threshold value including a first threshold value and a second threshold value, and one threshold value can be selected from among them, or switching between these threshold values can be made. Therefore, depending on the circumstances, by switching between these threshold values, a battery can be charged such that it has a high capacity and an excellent cycle life, or such that it has a higher capacity.

Further, the use of the charger of the present invention makes it possible to prevent unnecessary acceleration of deterioration in charge/discharge cycle life of a power supply system including a lithium secondary battery, which has been a problem with conventional related art. It is therefore possible to improve the stability of the power supply system, its reliability, and its maintainability such as the frequency of battery replacement.

In the foregoing Examples 1 and 2, Si or Ti—Si alloy was used as the negative electrode active material. Besides, a Si compound capable of absorbing and desorbing Li other than Si and Ti—Si alloy can also be used as the negative electrode active material. Also, when charging a battery using a metal, such as Sn or Ge, and an alloy of such metal as the negative electrode active material, the charger of the present invention can also be used.

Also, with respect to the positive electrode active material of a battery using Si or Ti—Si alloy as the negative electrode active material, any material known in the art as the positive electrode active material of a lithium secondary battery can be used in addition to $LiCoO_2$. Exemplary positive electrode active materials include $LiNiO_2$, $LiMn_2O_4$, such compounds further including other element(s), and such compounds with part of their constituent elements replaced with other element(s).

Further, in the foregoing Embodiments 1 to 3, the description has been made on the electronic apparatus equipped with the charger according to the present invention, but the use of only the charger can produce the above-described effects.

Since the charger of the present invention can select, as appropriate, either charging a secondary battery so as to provide a high capacity or charging so as to provide a long life, it can be used for cellular phones with a lithium secondary battery, etc. The charger of the present invention is also applicable to transportation apparatus, such as rechargeable automobiles having no generator.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A charger for a secondary battery comprising a positive electrode, a negative electrode including lithium-containing silicon represented by the composition formula $Li_xSi$, and an electrolyte,
    said charger comprising:
    (1) a voltage detector that detects voltage of said secondary battery that is being charged; and
    (2) a charge controller that calculates the value x in $Li_xSi$ included in said secondary battery from an output of said voltage detector and stops the charging of said secondary battery when the calculated value x reaches a predetermined threshold value,
    wherein said charge controller has at least one settable threshold value including a first threshold value, and said first threshold value is 2.33 or less.

2. The charger in accordance with claim 1, wherein said charge controller has at least two settable threshold values including a first threshold value and a second threshold value, said first threshold value and said second threshold value are freely switchable, said first threshold value is 2.33 or less, and said second threshold value is greater than 2.33 and not greater than 4.4.

3. The charger in accordance with claim 1, wherein said negative electrode further contains $MeSi_2$ where Me is at least one selected from the group consisting of Ti, Ni, Co and Fe.

4. The charger in accordance with claim 3, wherein said $MeSi_2$ comprises $TiSi_2$.

5. An electronic apparatus comprising a lithium secondary battery, a load and the charger of claim 1.

* * * * *